(12) United States Patent
Collopy

(10) Patent No.: US 9,786,067 B2
(45) Date of Patent: Oct. 10, 2017

(54) VISUAL MUSIC COLOR CONTROL SYSTEM

(71) Applicant: Fred Collopy, Cleveland Heights, OH (US)

(72) Inventor: Fred Collopy, Cleveland Heights, OH (US)

( * ) Notice: Subject to any disclaimer, the term of this patent is extended or adjusted under 35 U.S.C. 154(b) by 217 days.

(21) Appl. No.: 14/874,342

(22) Filed: Oct. 2, 2015

(65) Prior Publication Data

US 2017/0098313 A1    Apr. 6, 2017

(51) Int. Cl.
  *G06T 11/00* (2006.01)
  *G06T 11/40* (2006.01)

(52) U.S. Cl.
  CPC .......... *G06T 11/001* (2013.01); *G06T 11/40* (2013.01)

(58) Field of Classification Search
  CPC ............................. G06T 11/40; G06T 11/001
  See application file for complete search history.

(56) References Cited

U.S. PATENT DOCUMENTS

| | | | | |
|---|---|---|---|---|
| 7,180,524 B1* | 2/2007 | Axelrod | ................ | G09G 5/02 |
| | | | | 345/593 |
| 7,502,033 B1* | 3/2009 | Axelrod | ................ | G09G 5/06 |
| | | | | 345/440 |
| 8,089,492 B2* | 1/2012 | Titmuss | .............. | G06F 3/04845 |
| | | | | 345/589 |
| 9,147,378 B2* | 9/2015 | Shekey | .................... | G09G 5/06 |
| 2009/0200967 A1* | 8/2009 | Bergman | ........... | H05B 33/0863 |
| | | | | 315/363 |
| 2009/0204913 A1* | 8/2009 | Kawano | .............. | G06F 3/04847 |
| | | | | 715/762 |

OTHER PUBLICATIONS

Collopy, Fred, "Playing (With) Color", In Glimpse, 2009, vol. 2, Issue 3, pp. 62-67.
"The 28 Best Tools for Choosing a Colour Scheme", Graphic Design|Feature, Future Publishing Limited, Oct. 24, 2014, Retrieved at: <<http://www.creativebloq.com/colour/tools-colour-schemes-12121430>>, 33 pages.

(Continued)

*Primary Examiner* — Tapas Mazumder
(74) *Attorney, Agent, or Firm* — Medley, Behrens & Lewis, LLC

(57) ABSTRACT

Described herein are various technologies pertaining to presenting, and configuring, digital objects on a display device for application with a visual music presentation. An interactive screen can be presented on a touchscreen of a display device, wherein a visual musician can interact with one or more components and/or features comprising the screen to control presentation of the digital objects. A portion of the screen can be configured to initially present a continuous hue spectrum, which can subsequently be replaced with a discrete hue spectrum. Further, a spectrum comprising naturally visible hues can be modified such that a plurality of hues in the spectrum are positioned equally across the spectrum, and further, brightness of respective hues can be modified to enable presentment of a visually appealing visual music presentation.

20 Claims, 11 Drawing Sheets

(56) References Cited

OTHER PUBLICATIONS

"Colorbar (IDL Reference)", Exelis VIS Docs Center, Exelis Visual Information Solutions, Retrieved Date: Sep. 29, 2015, Retrieved at: <<http://www.exelisvis.conniclocs/COLORBAR.html>>, 10 pages.
Wijffelaars, et al., "Generating Color Palettes Using Intuitive Parameters", The Eurographics Association and Blackwell Publishing, 1981, vol. 0, Issue 0, Retrieved at: <<http://magnaview.nl/documents/MagnaView-M_Wijffelaars-Generating_color_palettes_using_intuitive_parameters.pdf>, pp. 1-8.

* cited by examiner

VISUAL MUSIC COLOR CONTROL SYSTEM

BACKGROUND

Two of the human senses that lend themselves to interesting and creative interaction are sight and sound. The sense of hearing has entertained for millennia in the forms of sounds that occur in a defined sequence (e.g., music). More recently, techniques involved with the presentment and enjoyment of audible information (e.g., in the form of a song) are being utilized in the field of visual music (aka color music), wherein, musical structure(s) can be applied to visual imagery and visual forms.

Representing a color spectrum with a computer-based representation can be problematic from a visual perspective, particularly in real-time applications, such as playing visual music (e.g., while improvising). Issues relating to such depiction include a natural hue spectrum (e.g., the visible spectrum in its natural form) provides an inordinate amount of space to particular colors relative to others, e.g., the green and blue portions of the visible spectrum comprise respectively larger portions of the natural hue spectrum relative to yellow, orange, and purple portions. Also, a perceived brightness of colors in the spectrum can vary across it, e.g., the brightness of one hue perceptually overwhelms that of others. Further, while playing visual music, it is desirable to be able to simultaneously change respective colors of a large number of related objects being presented (e.g., on a display) while maintaining a particular mood.

SUMMARY

The following is a brief summary of subject matter that is described in greater detail herein. This summary is not intended to be limiting as to the scope of the claims.

Described herein are various technologies related to presentation of one or more digital objects on a display device for a visual music performance. In an embodiment, the display device can include an interactive screen (e.g., a touchscreen) to enable presentation and control of the objects.

In a further embodiment, a portion of the screen (a hue spectrum region) can be configured to initially present a first spectrum, e.g., a continuous hue spectrum, which can be subsequently replaced by a second spectrum, e.g., a discrete hue spectrum.

In another embodiment, a natural hue spectrum comprising a natural arrangement of hues can be modified such that a plurality of base hues in the spectrum are positioned as desired, e.g., equally, across the spectrum. When a natural hue spectrum is utilized in visual music, and notes are mapped to hues in the natural spectrum, owing to certain colors being more predominant in the spectrum, more than one note may be assigned to a certain hue (e.g., the predominant greens) while other colors may not be assigned to a note at all (e.g., yellow). Thus, one or more functions can be applied to the natural hue spectrum to enable modification of the spectrum such that the base hues that are found on a color wheel are respectively associated with a particular note, wherein each note can occur at a predefined location across the spectrum (e.g., as a piano key arrangement). Accordingly, per the various embodiments presented herein, during presentation of the visual music, objects having a wide range of hues are presented and thus render the music more visually appealing than an approach based upon the natural hue spectrum. The modified spectrum enables colors to be presented that are closer to the empirical experience of the segments as represented in color theory and color naming.

In another embodiment, a continuous hue spectrum can be sectioned into a plurality of segments, with a particular hue being assigned to each respective segment, to form a discrete hue spectrum. Further, a vertical hue spectrum can be formed comprising segments that have a narrow band of hues (e.g., based upon pixel density of the display device) such that a color of an object can be altered between the close range of hues.

In another embodiment, one or more functions can be utilized to control relative brightness between colors so that an overall palette of hues is perceived to be balanced compared with a palette derived from a natural spectrum. For example, the brightness of colors in the green and purple color spaces can be reduced to prevent them from perceptually dominating other colors, such as orange, red, blue and yellow hues.

In a further embodiment, chords can be displayed to enable respective colors of a plurality of objects to be controlled simultaneously. A first object can be assigned to a first note in the chord, a second object can be assigned to a second note in the chord, etc. As a chord is modified, or replaced, the color(s) of respective objects assigned to a particular note will change in accordance with the chord modification and/or selection.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
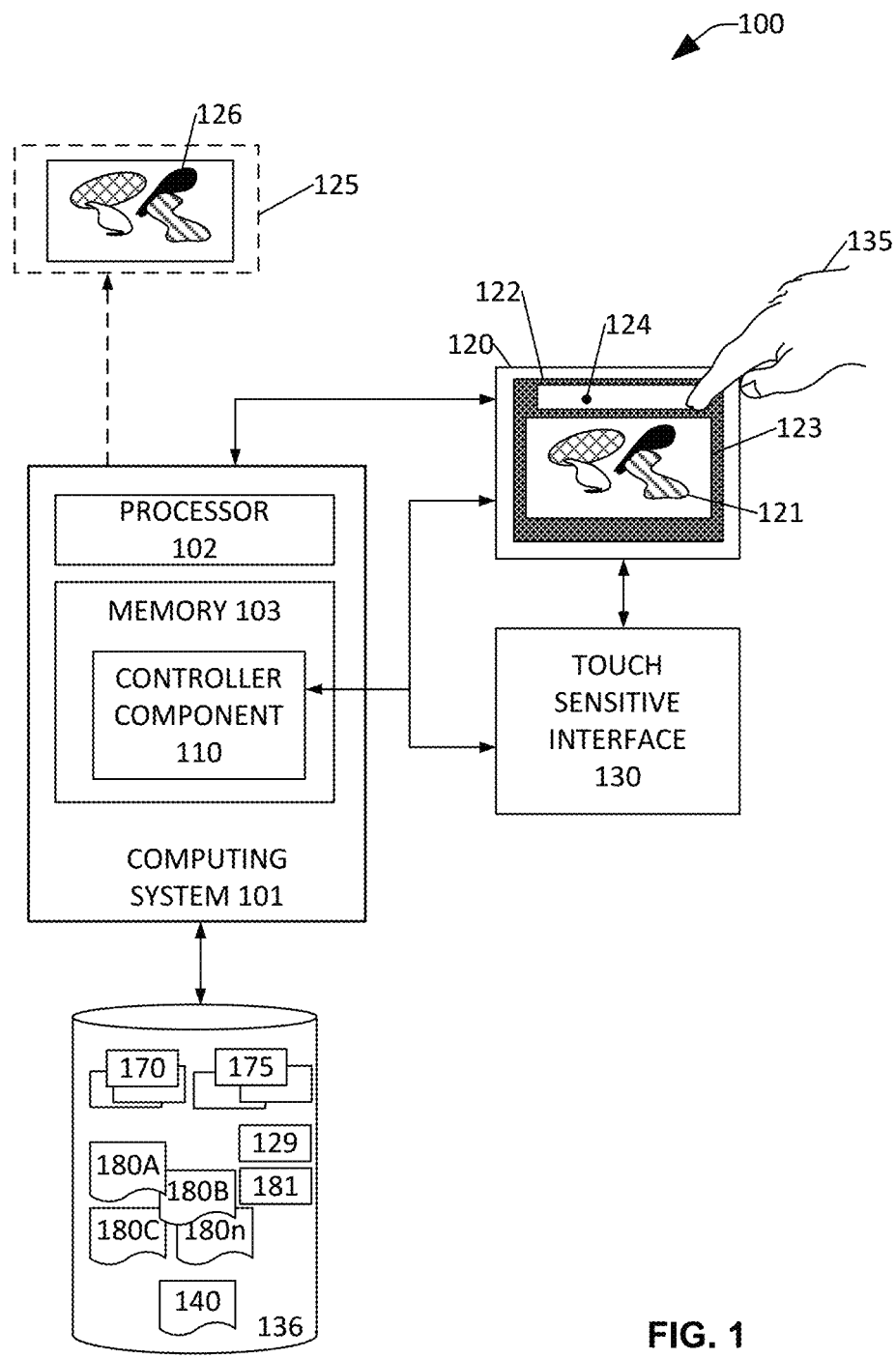
FIG. 1 illustrates an exemplary system for controlling presentation of one or more digital objects on a device.

Various technologies are presented herein pertaining to configuring and/or controlling presentation of objects (e.g., digital objects, visual objects) for visual music, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including FPGAs, Application-specific Integrated Circuits (ASICs), Application-specific Standard Products (ASSPs), System-on-a-chip systems (SOCs), Complex Programmable Logic Devices (CPLDs), etc.

A plurality of embodiments are presented herein relating to presentation of at least one object during presentation of visual music. A natural hue spectrum (e.g., a naturally occurring hue spectrum as seen by the unaided eye) can be modified to form a continuous hue spectrum having a transition of hues that is closer to the empirical experience of color representation in color naming and color theory. A naturally occurring hue spectrum may be visually unappealing when divided into equal segments, wherein each segment is assigned to a respective note in a series of notes as presented in visual music, e.g., the notes are presented visually in the form of color. As further described, when the natural hue spectrum is broken up into a plurality of notes, more than one note may comprise quite similar colors. Further, for color selection/interaction, a continuous hue spectrum can be replaced with a discrete hue spectrum. The term "unaided eye" relates to how an eye (e.g., a human eye) can perceive colors without utilizing color correction, e.g., infrared glasses, etc. An unaided eye is an eye that is seeing without the use of lenses, filters, etc., and if lenses are worn, the lenses are worn to correct conditions such as myopia, hyperopia, astigmatism, presbyopia, etc.

Herein the terms "hue" and "color" are used interchangeably and relate to the property of a color, and per colorimetry, e.g., in accordance with CIECAM2, a color appearance model published in 2002 by the International Commission on Illumination (CIE). Other properties relating to color which can be controlled (adjusted) in accordance with one or more embodiments herein include, chroma, saturation, lightness, and brightness.

FIG. 1 illustrates an exemplary system 100 that can be utilized to generate one or more spectrums from the natural hue spectrum, and further, present the one or more spectrums to enable control of how one or more objects are presented, e.g., in a visual music presentation. As further described, the various spectrums can be of a continuous format (e.g., a transition of hues wherein each adjacent hue has a minimal wavelength shift to the wavelength of a neighboring hue), or comprise segments of discrete color (e.g., each segment is filled with a single hue).

System 100 comprises a computing system 101 which can be configured to control generation of the one or more spectrums and further, control presentation of one or more objects on a display based at least in part upon the one or more spectrums. The computing system 101 comprises a processor 102 and memory 103, wherein the memory 103 comprises data that is accessible to the processor 102 and instructions that can be executed by the processor 102. With more particularity, the memory 103 comprises a controller component 110 that is configured to perform one or more functions on a received color spectrum, and further, control how one or more objects are presented on a display device 120.

As further described herein, the controller component 110 can be utilized to modify a natural hue spectrum to generate a modified spectrum. The modified hue can be utilized in conjunction with a plurality of notes which form a musical scale (e.g., a tune) to enable a visual presentation of at least one object, wherein a respective hue of the at least one object can be changed in accordance with a note selected from the sequence of notes in the musical scale. Further, the controller component 110 can be configured to segment the modified spectrum (e.g., in continuous form) to generate a spectrum comprising a plurality of discrete regions of color to further enable presentment of a particular hue for a given object. Based upon interaction with a system, presentation of the one or more spectrums (e.g., continuous spectrum→discrete spectrum→continuous spectrum . . . etc.) are interchangeable to enable control of the objects.

A display device 120 is further included in the system 100, wherein the display device 120 is configured to present one or more objects 121 thereupon, as further described herein. Moreover, the system 100 can optionally include a presentation component 125. Data communication between the display device 120 and the controller component 110 can be utilized, in an embodiment, to control presentation of objects on the presentation component 125, wherein the objects presented on the presentation component 125 can correlate to the one or more objects 121 presented on the display device 120 (e.g., a digital display comprising a plurality of pixels). For example, in an embodiment, the display device 120 can be a handheld device which is being played by a visual musician on a stage, and the presentation component 125 is a large display (e.g., a digital projector) at the back of the stage which can be seen by an audience. Hence, as the visual musician changes presentment of the one or more objects 121 (e.g., number of objects, object color, object location, etc.) on the display device 120, one or more corresponding objects 126 presented on the presentation component 125 are changed in a corresponding manner.

In a further embodiment, as further described herein, the display device 120 can also be configured to present a plurality of screens (e.g., interfaces, displays, etc.) that can be utilized to select, generate, configure, etc., the object(s)

121 presented on the display device 120, and accordingly, the one or more objects 126 presented on the presentation component 125. Such objects 121 can include a two dimensional shape(s), a three dimensional shape(s), a line(s), a background, a foreground, a middleground, a layer, etc., wherein a plurality of object properties 129 can be controlled and/or manipulated, where such properties 129 include a hue(s), a brightness, a contrast(s), size, position, duration of presence, etc. The properties 129 can be stored at, and retrieved from, a storage device 136, wherein the storage device 136 can be accessed by any of the computing system 101, processor 102, display device 120, presentation component 125, touch sensitive interface 130, the controller component 110 (and components located therein), etc.

An example object configuration screen 122 is illustrated in FIG. 1, and comprises of an object presentation region 123 which can be configured to present the one or more objects 121 enabling a user to see how the one or more objects 121 will be presented on the presentation component 125. As mentioned, a plurality of hue spectrums (e.g., continuous hue spectrum, discrete hue spectrum, etc.) can be utilized to configure coloration of the one or more objects 121, wherein the object configuration screen 122 can include a hue spectrum region 124 which can be configured to present the plurality of hue spectrums. Operation of the hue spectrum region 124 can be configured such that a first hue spectrum can be initially presented in the hue spectrum region 124, and subsequently replaced by a second hue spectrum, thereby enabling color configuration of the one or more objects 126 in a plurality of interactive executions, as further described herein. Also, as further described, the object configuration screen 122 can further include other regions, buttons, selectors, etc., to enable interaction with, and configuration of, the one or more objects 121 presented on the object configuration screen 122.

It is to be appreciated that while the selection between a continuous hue spectrum and a discrete hue spectrum is presented herein with regard to display of one or more objects in a visual music presentation, the various embodiments can also be applied to other applications requiring presentation of a continuous hue spectrum and/or a discrete hue spectrum. For example, software for generation and/or editing of computer graphics (e.g., digital objects) can utilize a color selection feature to present a plurality of colors on a screen for selection by a user, e.g., to apply to an object, text, etc. Such color selection features (panels, screens) include a color wheel, a plurality of swatches having different hues, a ribbon of colors transitioning from a first hue to a second hue (with a plurality of hues therebetween), etc., from which a user can select a desired color. The color selector(s) is typically displayed on a computer screen (e.g., in a graphical user interface, GUI in response to selection from any of a drop-down menu (drop-down list, drop menu), a list box, a button, a radio button, a cycle button, a spinner, a menu, an icon, a tree view, a link, a scrollbar, a text box, a combo box, a balloon help, a dialog box, a check box, a widget, or other graphical control element, wherein the color selector(s) can be included in such GUI components as a panel, a window, a tab, a palette, etc. Such color selector(s) can also be utilized for selection of font color in any computer application that includes presentation of text, numbers, symbols, etc., e.g., a word processor, a spreadsheet, etc. Typically, a color selector(s) is presented in a fixed manner, whereby, for example, a user selects a first tabbed panel having a color ribbon thereon to enable selection of a custom color, and selects a second tabbed panel having a plurality of swatches thereon to select a standard, predefined color. The various embodiments presented herein can be utilized with such computer applications, wherein a continuous spectrum can be replaced with a discrete spectrum, and vice versa, at the hue spectrum region 124.

In an embodiment, the display device 120 can be a touch sensitive display, wherein position and/or motion of a pointer 135 (e.g., a finger, stylus, etc.) on or proximate to an outer surface (e.g., a screen) of the display device 120 can be detected and utilized to control presentation of the one or more objects 121 (and properties 129) presented on the display device 120 (e.g., as presented at one or more regions of the object configuration screen 122). A touch sensitive interface 130 is also included in system 100, and is configured to detect and/or capture position and/or motion of the pointer 135 relative to the surface of the display device 120, and the object configuration screen 122 presented thereon. The position and/or motion of the pointer 135 captured by the touch sensitive interface 130 can be forwarded to the controller 110, for subsequent determinations and/or selections to be made based upon the captured position and/or motion data.

It is to be appreciated that while the various embodiments presented herein are directed towards utilizing a touch sensitive screen to enable interaction with one or more screens presented herein, interaction can also be by means of navigating the screens with a computer mouse and selecting required hues, spectrums, etc., by mouse cursor selection, or other suitable selection technique.

It is to be further appreciated that while the display device 120 can be hand held device, and suitable computing device can be utilized with the various embodiments herein, e.g., a personal computer, a tablet pc, a smart phone, a mobile computing device, etc. Also, the display device 120 can be incorporated into a support device, such as a support device shaped like a musical instrument, e.g., shaped like a guitar, a keyboard, a violin, etc.

Figure 2:
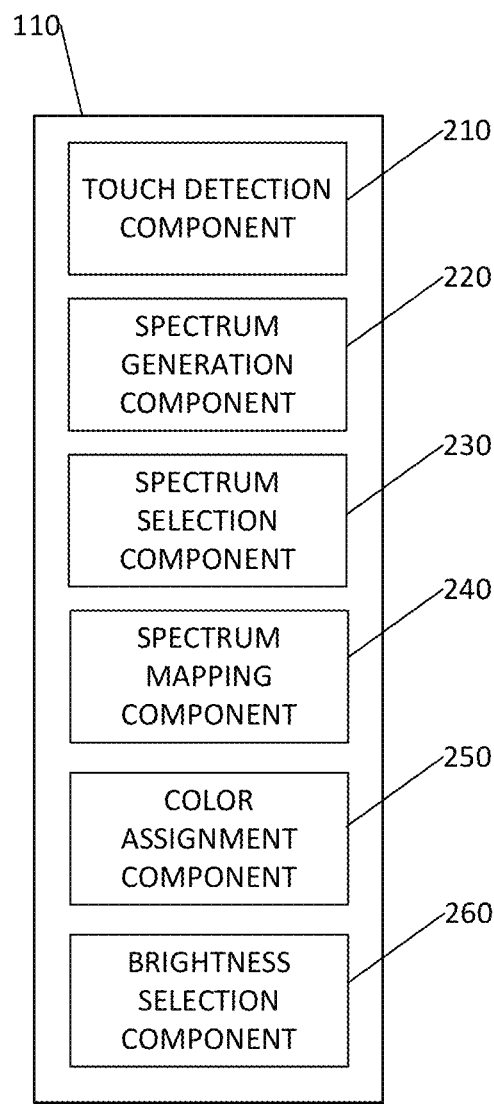
FIG. 2 presents an exemplary controller component and various components included therein.

Turning momentarily to FIG. 2, as previously mentioned, the controller component 110 can comprise a plurality of components to enable one or more of the embodiments presented herein. The controller component 110 can include a touch detection component 210 which can operate in conjunction with the touch sensitive interface 130 to detect interaction of the pointer 135 with the display device 120. For example, the touch detection component 210 can detect positioning of the pointer 135 with respect to one or more pixels included in the object configuration screen 122.

The controller component 110 can further include a spectrum generation component 220 which can be configured to generate a hue spectrum (e.g., a modified hue spectrum, a discrete hue spectrum) from, for example, a natural hue spectrum, as particularly described with reference to FIGS. 3 and 4. Alternatively, according to another example, it is contemplated that the hue spectrum(s) (e.g., the modified hue spectrum, the discrete hue spectrum) can be predefined.

The controller component 110 can further include a spectrum selection component 230 configured to select a hue spectrum for display (e.g., on display device 120) based, at least in part, upon a determination of whether an interaction (e.g., between pointer 135 and display device 120) is based upon a desire for a currently displayed hue spectrum (e.g., currently displayed at the hue spectrum region 124) to continue to be displayed to enable further interaction with the hue spectrum, or the hue spectrum is to be replaced with another hue spectrum (e.g., a currently displayed discrete hue spectrum is to be replaced with a continuous hue spectrum) to enable interaction with the newly displayed spectrum.

To enable interaction with one or more features (e.g., color selection, object selection, etc.) presented on the object configuration screen 122, one or more pixels included in the screen can be assigned (mapped to) a particular hue. For example, when a first spectrum is being displayed (e.g., a continuous spectrum) a specific pixel in the plurality of pixels of the hue spectrum region 124 can be mapped to a particular hue corresponding to the hue in the first spectrum, such that when the pixel is selected, the hue assigned to the pixel is applied to an object(s) 121. Hence, when a second hue spectrum (e.g., a discrete hue spectrum) is displayed, the plurality of pixels in the hue spectrum region 124 are remapped to the respective hues in a respective segment of the second hue spectrum. A spectrum mapping component 240 can be included in the controller component to enable mapping of the plurality of pixels to a particular hue, based in part upon the spectrum being displayed in the hue spectrum region 124.

A color assignment component 250 can be included in the controller component 110 to enable a color(s) to be selected from a hue spectrum and be applied to an object(s) 121. The color assignment component 250 can receive information regarding a pixel being selected (e.g., relative to a hue spectrum being displayed in the hue spectrum region 124), wherein the pixel information can be received from the touch detection component 210 operating in conjunction with the colors mapped by the spectrum mapping component 240.

The controller component 110 can further include a brightness selection component 260 which can be utilized to adjust brightness of particular hues in a spectrum relative to others.

Returning to FIG. 1, a plurality of spectrums can be received at the computing system 101, and further, can be generated at the computing system 101. For example, a natural hue spectrum 140 (e.g., comprising the naturally visible spectrum of hues) can be received (e.g., and stored in the storage device 136) at the computing system. Accordingly, to enable presentation of visual music where a viewer is able to determine a note being played based upon a particular hue assigned to an associated object 121, the natural hue spectrum 140 can be modified (adjusted) in a plurality of ways to enable visual comprehension of the visual music. A plurality of functions 170 can be utilized (e.g., by the controller component 110, or a component(s) included therein) to modify the natural hue spectrum 140 to generate a plurality of modified spectrums 180A-180n to be utilized for coloration of the one or more objects 121 being rendered on the display device 120, and the presentation component 125, where n is a positive integer. The modified spectrums 180A-180n can comprise a modified continuous spectrum, a discrete spectrum, a vertical spectrum, etc. Other functions 175 can be utilized by the controller component 110 (and components included therein) to determine interaction with a hue spectrum(s) presented on the object configuration screen 122.

The one or more functions 170 (e.g., algorithms, components, etc.) can be a linear function(s), a logarithmic function(s), etc. In an embodiment, a function 170 can be a step-wise linear function(s) to map a standard representation of the natural hue spectrum 140 into a plurality of segments such that available hues are arranged in a manner that is closer to the color representation in color naming and color theory. In another embodiment, the function(s) 170 (e.g., utilized by the brightness selection component 260) can also be a linear function to enable an adjustment of the relative brightness of a color represented in a segment such that an overall palette of colors is visually perceived as being balanced. For example, the brightness of colors in the green (G) and purple (P) segments can be reduced to prevent perceptual domination of these colors over the orange (O), red (R), blue (B) and yellow (Y) segments.

Figure 3:
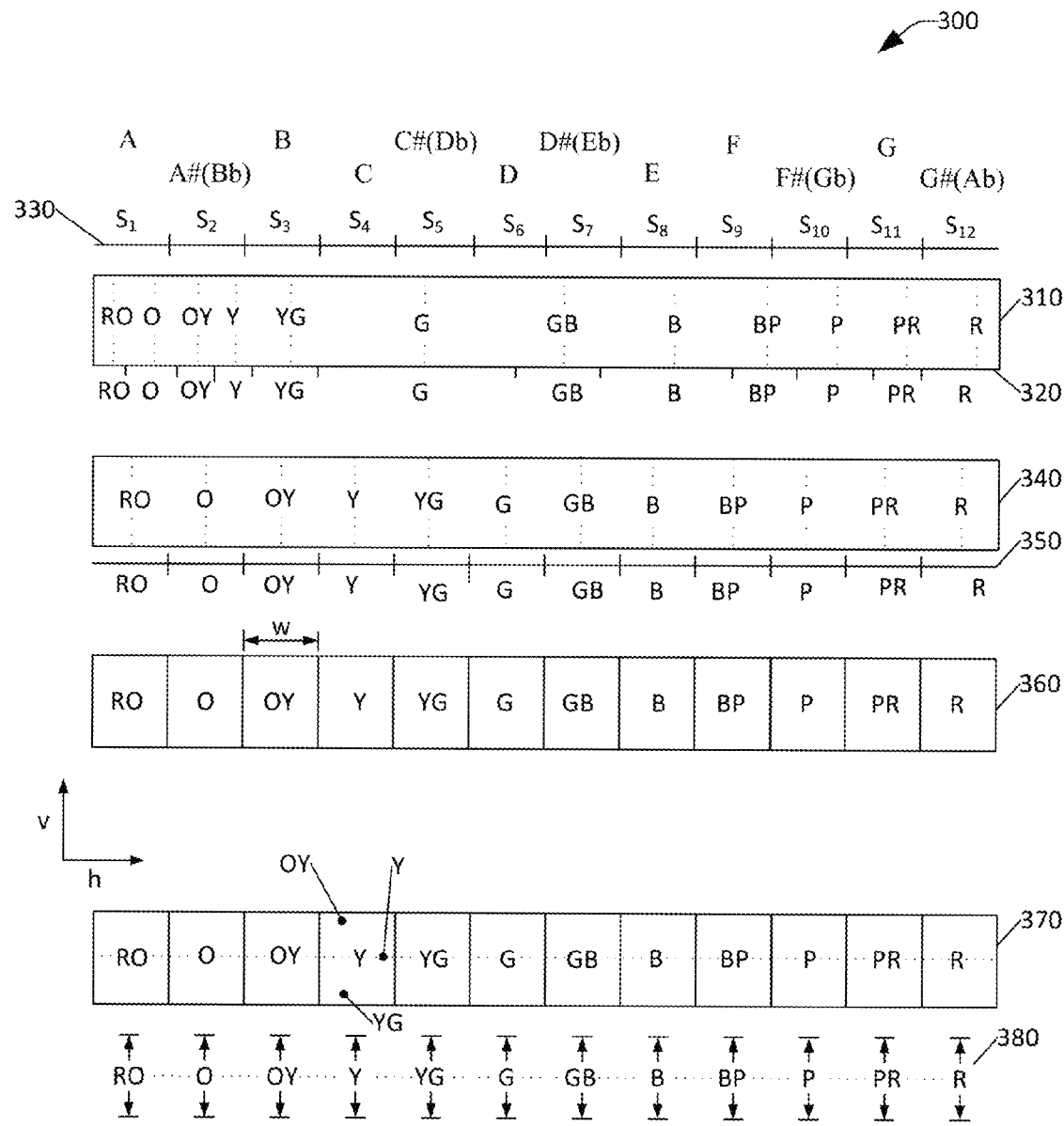
FIG. 3 illustrates a plurality of hue spectrums that can be utilized in accord with one or more embodiments presented herein.

Turning to FIG. 3, a natural hue spectrum comprising a plurality of hues with a distribution visible to the unaided eye can be received at the computing system 101. The natural hue spectrum 310 (e.g., similar to the spectrum 140) represents such a natural spectrum, wherein the natural hue spectrum 310 is a continuous spectrum comprising a plurality of hues. Owing to the limits of reproduction, it is not possible to present the natural hue spectrum 310 in color, however, as shown in conjunction with spectrum line 320, the natural hue spectrum 310 can be broken down into a plurality of hues, for example, twelve base hues comprising six primary hues red (R), orange (O), yellow (Y) green (G), blue (B), and purple (P) and intermediate hues red-orange (RO), orange-yellow (OY), yellow-green (YG), green-blue (GB), blue-purple (BP), and purple-red (PR). Depending upon a number of pixels separating each respective hue displayed on the hue spectrum region 124, a plurality of intermediate hues can be displayed between each neighboring pair of base hues. The number of intermediate hues can be a function of the screen resolution of the display device 120 (e.g., 264 pixels per inch (ppi), 326 ppi, etc.). For example, if a ½" display comprising 132 pixels separates a first hue (e.g., Y) from a second hue (e.g. OY), 132 intermediate hues can occur between the first hue and the second hue. Accordingly, per the foregoing, a transition from a first intermediate hue to a neighboring, second intermediate hue, can be a short wavelength transition.

Six of the base hues in the natural hue spectrum 310 have the following wavelengths, frequencies, and photon energies, per Table 1:

TABLE 1

Properties of different colors

| Color | Wavelength | Frequency | Photon energy |
| --- | --- | --- | --- |
| Purple (P) | 380-450 nm | 668-789 THz | 2.75-3.26 eV |
| Blue (B) | 450-495 nm | 606-668 THz | 2.50-2.75 eV |
| Green (G) | 495-570 nm | 526-606 THz | 2.17-2.50 eV |
| Yellow (Y) | 570-590 nm | 508-526 THz | 2.10-2.17 eV |
| Orange (O) | 590-620 nm | 484-508 THz | 2.00-2.10 eV |
| Red (R) | 620-750 nm | 400-484 THz | 1.65-2.00 eV |

As shown in Table 1, and as indicated by the respective positions of each base hues marked by the dotted line, the base hues are not equally spaced throughout the natural hue spectrum 310. Further, as shown by the spectrum line 320, the green (G) hue portion and the blue (B) hue portion take up greater portions (respectively about ¼ and ⅕) of the hue spectrum than other respective hue portions, for example, the green-blue (GB) portion or the yellow (Y) portion are both narrower than the green (G) and blue (B) portions.

Per the segment line 330, a spectrum can be divided up into a plurality of segments, thereby enabling the naturally occurring, visible spectrum (e.g., natural hue spectrum 310) to convey one or more musical scales in visual music. Segment line 330 comprises twelve equally spaced segments $(S_1-S_{12})$ (e.g., having width w), wherein the segments can be arranged as a series of notes, e.g., any of A-A$^\sharp$(B$\flat$)-B-C-C$^\sharp$ (D♭)-D-D♯(E♭)-E-F-F♯(G♭)-G-G♯(A♭), arranged like keys (e.g., piano keys). However, owing to the non-equal spacing of the twelve base hues in the natural hue spectrum 310, some hues may align with more than one segment or key. For example, the green (G) portion of spectrum line 320 covers segments $S_4$-$S_6$ of segment line 330, and similarly, the blue (B) portion of spectrum line 320 covers segments $S_8$-$S_9$ of the segment line 330, while the red (R) portion only covers $S_{12}$, and the orange-yellow (OY) portion is partially contained in the $S_2$ segment. Further, given the placement of the yellow (Y) portion relative to the orange-yellow (OY) portion and the yellow-green (YG) portion with respect to the segments $S_2$ and $S_3$, the yellow (Y) portion of the spectrum line 320 may not be represented by any segment in segment line 330.

It is to be appreciated that while the segments $S_1$-$S_{12}$ are presented herein as being equally spaced (e.g., with width w), the segments can be arranged in any manner, such as with variable widths, a combination of variable widths and common widths, etc.

As shown in FIG. 3, the twelve segments $S_1$-$S_{12}$ can also have a musical note respectively assigned thereto. It is to be appreciated that while the sequence of notes (scale) starts with note A being at segment $S_1$, the sequence can start at any segment, e.g., note A can be assigned to segment $S_7$, wherein the notes would wrap around with note G♯ being located at segment $S_6$. Alternatively, the notes can be assigned to the segments $S_1$-$S_{12}$ in a non-sequential manner, and further with random assignment. For example note A can be assigned segment $S_3$, while note A♯ is assigned to segment $S_9$, note B is assigned to segment $S_{10}$, etc.

As mentioned, a function (e.g., function 170) can be applied to the natural hue spectrum 310 to facilitate adjustment of the respective hue positions (e.g., relative to the segments $S_1$-$S_{12}$ of segment line 330) such that a visually appealing array of colors are respectively assigned to each of the segments $S_1$-$S_{12}$, and accordingly, each of the notes in the musical sequence A-G♯. Discussion of the respective hues and segment allocation is limited owing to the images herein being black and white in nature. However, as shown, a modified spectrum is a second spectrum 340, and further, as shown in spectrum line 350 in conjunction with segment line 330, each of the hues RO, O, OY, Y, YG, G, GB, B, BP, P, PR, and R have been assigned to each respective segment $S_1$-$S_{12}$. Accordingly, each position indicated in the spectrum 340 has a unique base hue assigned thereto. Hence, the segments and colors presented in the second spectrum 340 are $S_1$-RO, $S_2$-O, $S_3$-OY, $S_4$-Y, $S_5$-YG, $S_6$-G, $S_7$-GB, $S_8$-B, $S_9$-BP, $S_{10}$-P, $S_{11}$-PR, $S_{12}$-R. Spectrums 310 and 340 are both continuous spectrums, wherein the respective base hues merge into neighboring hues as a function of other intermediate hues, e.g., color Y in segment $S_4$ transitions to color YG in segment $S_5$ based upon a plurality of intermediate hues.

Figure 4A:
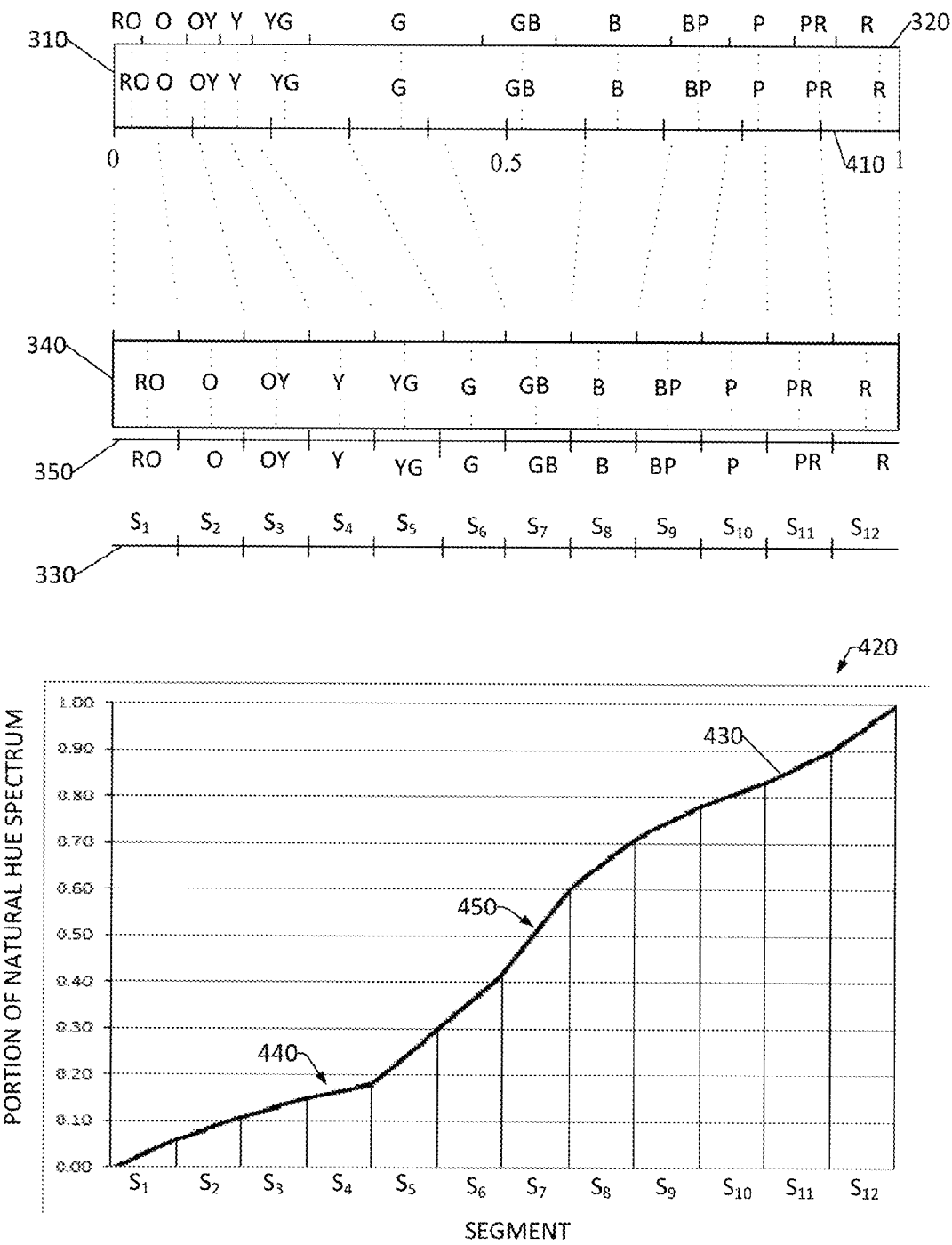
FIG. 4A illustrates how a natural hue spectrum can be adjusted to form a modified spectrum.

An example of how the natural hue spectrum 310 can be modified to form the modified hue spectrum 340 is illustrated in FIG. 4A. As shown by the dotted lines between the natural hue spectrum 310 and the modified hue spectrum 340, portions of the natural hue spectrum 310 are reduced to fit into a respective segment (e.g., the G region of the spectrum 310 is reduced to fit segment $S_6$), while other portions of the spectrum 310 are enlarged to fit into a respective segment (e.g., the Y region of the spectrum 310 is enlarged to fit into segment $S_4$). To achieve the modification of the spectrum 310 to form the modified spectrum 340, the color space of the spectrum 310 can be represented as a continuous 0.00-1.00 variable (e.g., in 0 to 1 space), anchored by red-orange (RO) at one extreme (left hand) and red (R) at the other, per the gradation line 410. The gradation line 410 is broken into twelve segments, wherein the portion of the spectrum that is assigned to each of the twelve segments is selected to center on a perceptually identifiable hue. In an embodiment, a function 170 can be utilized by the controller 110 (e.g., by the spectrum generation component 220) to modify the natural hue spectrum 310 to form the modified hue spectrum 340, wherein the function 170 can be a stepwise linear function, and the stepwise linear function is fitted using the twelve pairs of values. Table 2 presents an exemplary set of values, as measured along the gradation line 410, indicating how respective ranges are enlarged or decreased to fit the segments $S_1$-$S_{12}$.

TABLE 2

Portions of a natural hue spectrum fitted to a spectrum

|    | Lower Bound | Upper Bound | Brightness adjustment | Segment |
|----|---|---|---|---|
| RO | 0.00 | 0.06 | 1.0 | $S_1$ |
| O  | 0.06 | 0.11 | 1.0 | $S_2$ |
| OY | 0.11 | 0.15 | 1.0 | $S_3$ |
| Y  | 0.15 | 0.18 | 1.0 | $S_4$ |
| YG | 0.18 | 0.30 | 0.9 | $S_5$ |
| G  | 0.30 | 0.42 | 0.8 | $S_6$ |
| GB | 0.42 | 0.60 | 0.8 | $S_7$ |
| B  | 0.60 | 0.71 | 1.0 | $S_8$ |
| BP | 0.71 | 0.78 | 0.9 | $S_9$ |
| P  | 0.78 | 0.83 | 0.7 | $S_{10}$ |
| PR | 0.83 | 0.90 | 0.9 | $S_{11}$ |
| R  | 0.90 | 1.00 | 1.0 | $S_{12}$ |

Further, graph 420 illustrates a plot 430 of the relationship between the respective hue portions of the natural hue spectrum (e.g., spectrum 310) and the respective segment to which the portion of the plot 430 is assigned. As shown in graph 420, respective portions of the 0.00-1.00 variable forming the natural hue spectrum are applied to the twelve segments $S_1$-$S_{12}$. A segment comprising a shallow line of plot 430 indicates that the portion of the 0.00-1.00 variable has been enlarged (e.g., line portion 440 of segment $S_4$ for the yellow (Y) hue), while a steep line of plot 430 indicates that the portion of the 0.00-1.00 variable has been reduced (e.g., line portion 450 of segment $S_7$ for the green-blue hue (GB) hue).

Modification of the natural hue spectrum 310 to the modified hue spectrum 340 can be based upon identifying a wavelength (or frequency) for a first color, assigning that first color to a middle point of a first segment, and then identifying intermediate hues either side of the first color to enable a smooth transition across the first segment to a neighboring segment(s) (e.g., a second segment and a third segment respectively located on either side of the first segment), in accordance with a second color assigned to a midpoint of the neighboring segment. For example, the wavelength for the color blue (B) is assigned to the midpoint of segment $S_8$ (per spectrum line 350 and segment line 330), and the wavelength for the blue-purple (BP) hue is assigned to the midpoint of segment $S_9$, wherein the intermediate hues are placed therebetween.

While the spectrums 310 and 340 are continuous spectrums, a discrete spectrum can also be formed, as shown in spectrum 360 and spectrum line 350 of FIG. 3. For each segment $S_1$-$S_{12}$ a single respective hue is utilized, wherein, in an example embodiment, the hues are RO, O, OY, Y, YG, G, GB, B, BP, P, PR, and R. In an embodiment, the discrete hue spectrum 360 can be formed by aligning the continuous hue spectrum 340 between a first hue and a second hue, such that the continuous hue spectrum 340 is aligned horizontally between the first hue and the second hue. The continuous hue spectrum 340 can be divided into a plurality of segments (e.g., by the spectrum generation component 220), wherein the division is performed such that the plurality of segments are of equal width along the horizontally aligned continuous hue spectrum (per segment line 350). A base hue can be identified in each segment in the plurality of segments, wherein each segment can be assigned with the base hue identified in each respective segment. For each pixel included in each respective segment, the pixel is colored with the base hue identified for that segment (e.g., by the spectrum mapping component 240). As further described, a single color can be applied to an object 121 presented on the display device 120 by selecting the desired segment $S_1$-$S_{12}$, wherein, application of the color to the object can be performed by the color assignment component 250.

In another embodiment, the spectrum generation component 220 can be utilized to generate a spectrum comprising a combination of a continuous spectrum (e.g., spectrum 340) and a discrete spectrum (e.g., spectrum 360), as shown in spectrum 370, referred to herein as a vertical spectrum. Referring to spectrum 340, the continuous spectrum can be further divided into the twelve portions, wherein each portion of the spectrum 340 formed from the divisioning operation is applied to a respective segment $S_1$-$S_{12}$. In an embodiment, the divisioning operation comprises aligning the continuous hue spectrum 340 between a first hue (e.g., RO) and a second hue (e.g., R), such that the continuous hue spectrum 340 is aligned horizontally between the first hue and the second hue. The continuous hue spectrum 340 is subsequently divided into a plurality of portions, where the division is performed such that the plurality of portions are of equal width (w) along the horizontally aligned continuous hue spectrum 340. Hence, at divisioning, each portion comprises a constant hue in the vertical direction (v) but transitions across a plurality of hues in the horizontal direction (h). Subsequently, during assignment of each respective portion to a segment, each portion is rotated through 90° such that there is a constant hue in the horizontal direction (horizontal plane), and hues transition vertically (vertical plane) across each respective portion, as shown in the vertical arrows 380 for each segment of vertical spectrum 370. For example, the yellow (Y) hue portion is assigned to segment $S_4$, wherein the yellow (Y) hue is positioned at a central point, and the intermediate hues tending towards OY are positioned above, and the intermediate hues tending towards YG are positioned below, the centrally placed yellow (Y) hue. As further described, when the pointer 135 is traced vertically across a segment in the vertical spectrum 370, the color of an associated object 121 displayed on the display device 120 transitions through the hues which are navigated by the pointer 135 as it traces across the display device 120.

Figure 4B:
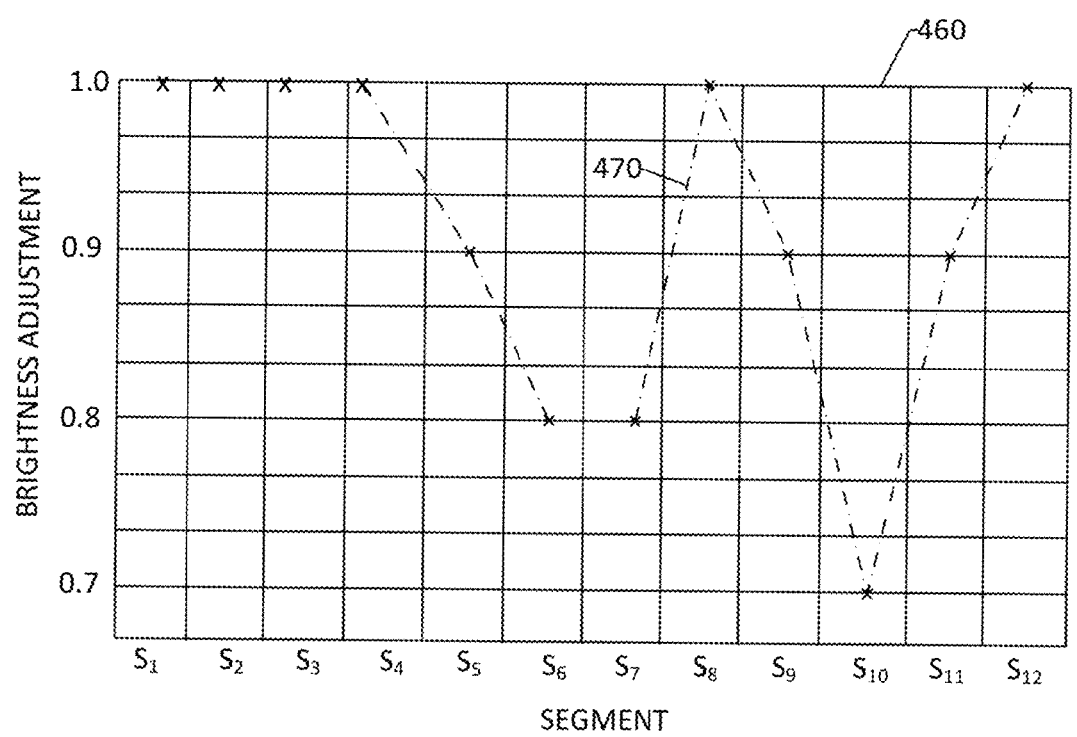
FIG. 4B illustrates brightness adjustment of respective segments of a modified spectrum.

FIG. 4B further presents graph 460, plot 470 which indicates an adjustment in brightness applied to a specific color to be applied to an object 121, wherein the brightness adjustment values of plot 470 are based upon the example values presented in Table 2. An empirical adjustment can be made to the brightness component of a hue-saturation-brightness (HSB) model so that each of the hues appears with similar visual impact, e.g., the hues are displayed with a common brightness, a common level of brightness, a consistent perceptual level, etc. For the hues presented in Table 2, the average brightness for each of the twelve steps is shown. The brightness adjustments for the presented example values are directed towards adjustments made to the green color space (e.g., segments $S_6$ and $S_7$) and the purple color space (e.g., segments $S_9$-$S_{11}$). A function (e.g., function 170) utilized to adjust the brightness can utilize linear interpolation between the value of one step and the next step to enable continuity along the spectrum. Adjustment of a brightness of a color can be performed by the brightness selection component 260.

Figure 5A:
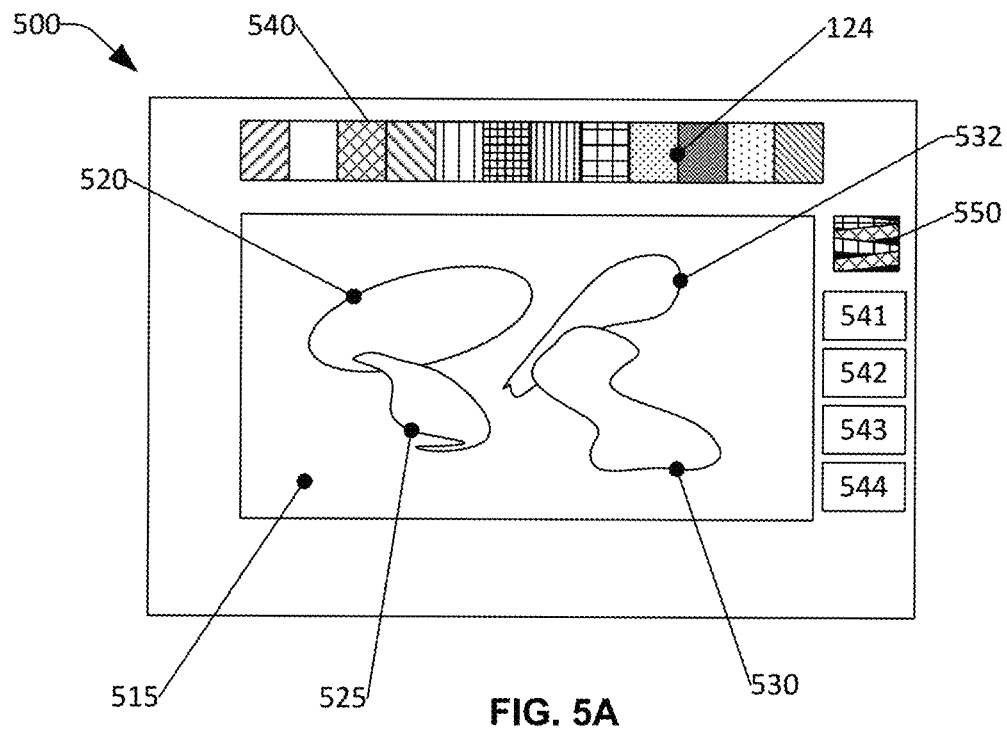
FIG. 5A presents an example screen facilitating interaction and control of digital objects.

Referring to FIG. 5A, an example screen 500 displayed on the display device 120 (and the presentation component 125) is presented. As shown, a central region 515 can be utilized to present one or more objects (e.g., the one or more object 121). In the example screen 500, four objects 520, 525, 530, and 532 are presented. A hue spectrum region 124 is located at the top of the screen 500, wherein the hue spectrum region 124 can be a portion of the screen 500 assigned for presentment (location) of one or more hue spectrums (e.g., any of the spectrums 140, 180A-180n, 310, 340, 360, and/or 370). Per the example screen capture, a discrete hue spectrum 540 (e.g., spectrum 340, spectrum 360) is located at the hue spectrum region 124. As previously mentioned, a color(s) can be applied to each object (e.g., any of objects 520, 525, 530, 532) based, at least in part, upon a color selected from a spectrum displayed at the hue spectrum region 124.

To generate and/or select an object(s), a plurality of object selectors 541-544 are illustrated, wherein a particular selector is associated with a particular object, enabling the particular object to be initially generated and subsequently selected. For example, the first object 525 is associated with the first object selector 541 and thus, the first object 525 is generated and/or selected based upon selection of the first object selector 541. In another example, the second object 530 is associated with the second object selector 542 and thus, the second object 530 is generated and/or selected based upon selection of the second object selector 542. Hence, to change the color of the second object 530, the second object selector 542 is selected (e.g., with the pointer 135) causing the second object 530 to be selected, whereupon a color can be assigned to the second object 530 based upon a color selected from a spectrum presented at the hue spectrum region 124.

A chord structure 550 is presented, wherein the colors of the respective objects 520-532 can be defined in accordance with respective colors in the chord structure 550. Because it may be desirable to play a visual music instrument in real time (improvisationally), it is useful for a player to be able to change colors of multiple objects simultaneously. The chord structure 550 is based, in part, upon a musical structure of chords. In an embodiment, when an object is created, the object is assigned a note identity, and based thereon, when the chord structure 550 is selected (and other available chord structure variations), the object assigned to a respective note is configured with the color defined for the note. For example, the bottom most line is note 1 (with a first object assigned thereto), the line above it is note 2 (with a second object assigned thereto), the second line from the top is note 3 (with a third object assigned thereto), and the top line is note 4 (with a fourth object assigned thereto). Hence, adjusting a hue of one object (e.g., the first object) can cause respective hues of the other objects (e.g., the second object, the third object, the fourth object) to also be adjusted to maintain a hue relationship between the plurality of hues, and thereby maintain the relationship of note identities of the respective objects within the chord structure.

Figure 5B:
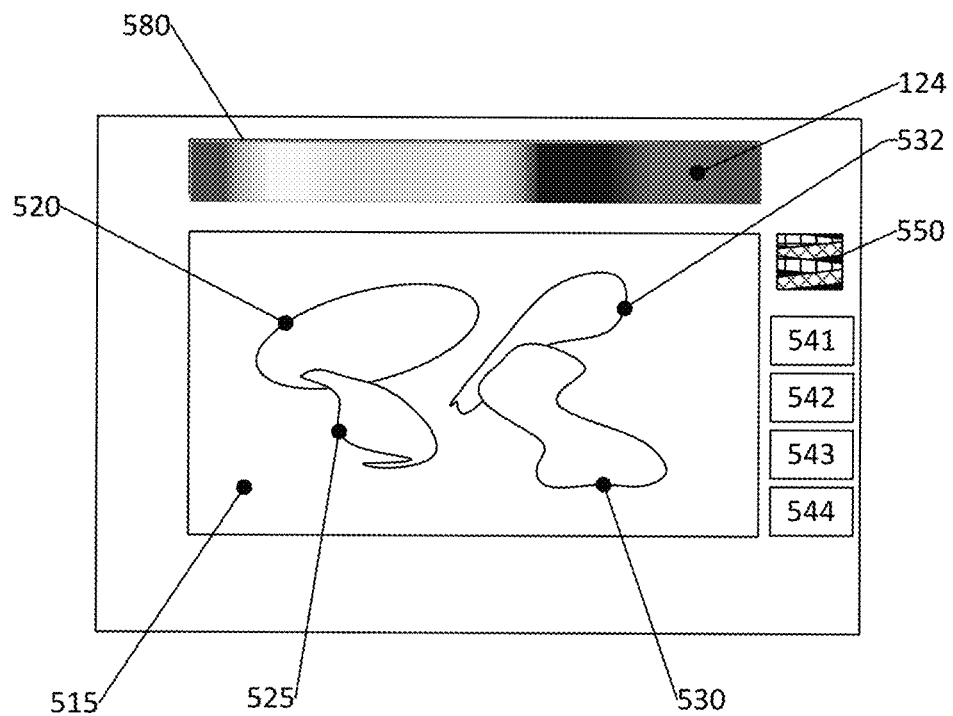
FIG. 5B presents an example screen with a continuous spectrum displayed.

FIG. 5B illustrates an object configuration screen 122 with a continuous spectrum 597 (e.g., spectrum 310, spectrum 340) located at the hue spectrum region 124, wherein the continuous spectrum 597 can be utilized to configure any of the objects 520-532. As previously described, the continuous spectrum 580 and the discrete spectrum 540 can be swapped out at the hue spectrum region 124.

Figure 6:
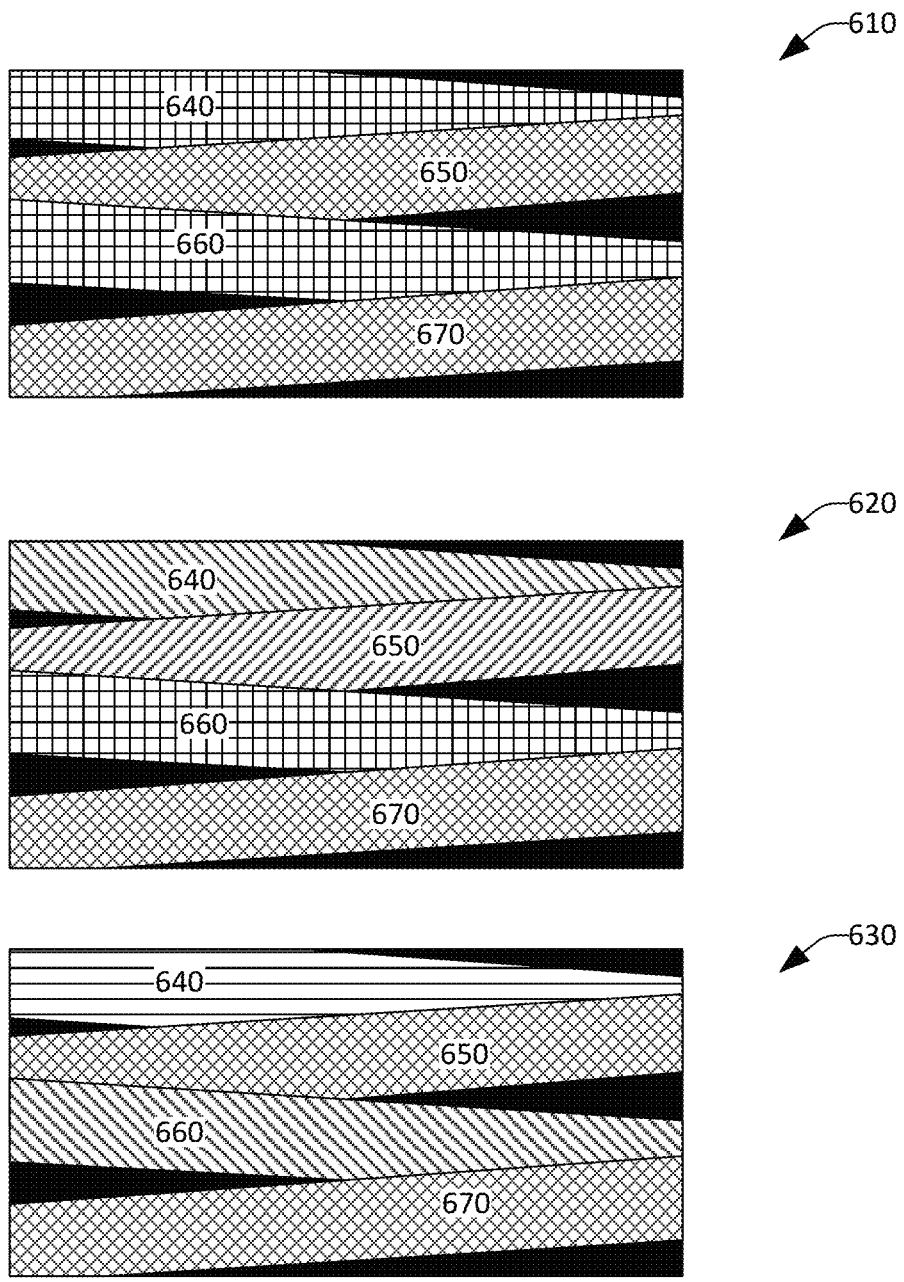
FIG. 6 presents a plurality of chords to simultaneously configure coloration of a plurality of digital objects.

Turning to FIG. 6, three chord charts 610, 620, and 630 are illustrated, wherein each chord charts comprises configuration colors for four notes comprising a chord formed from a first note 640 (assigned to a first object), a second note 650 (assigned to a second object), a third note 660 (assigned to a third object), and a fourth note 670 (assigned to a fourth object). Hence, to change coloration of the four objects simultaneously, a first chord (e.g., chord 610) can be selected and subsequently, a second chord (e.g., chord 630) can be selected. As shown by the various common and different crosshatching styles, for configuration 610, the first note and the third note have the same color, and the second note and the fourth note have the same color. For configuration 620, all of the notes have a different coloration. For configuration 630, the second note and the fourth note have the same color, while the first note and the third note have different colorations. Thus by selecting the first chord 610 and the third chord 630, the second and fourth notes (and their related objects) remain displaying the same color, while the first and third notes, while starting with the same color transition to different colors as the third chord is activated. The chromatic relationships (color harmonies) between the colors utilized for the respective notes (and associated objects) can be of any configuration, e.g., the colors can be complementary, analogous, triad, split complementary, tetradic (rectangular), square, etc.

As mentioned, the color of the one or more objects can be configured based upon a plurality of interactions of the pointer 135 with the display device 120, as detected by the touch sensitive interface 130 (e.g., at the hue spectrum region 124), and the touch detection component 210. A particular result of an interaction can be based upon a function of the spectrum that is currently being displayed (e.g., on display device 120) and the detected interaction, where, in a non-exhaustive list, the interactions include:

(a) controlling which hue representation, e.g., discrete, continuous, or vertical, is presented on the display 120. For example, if a continuous spectrum (e.g., spectrum 310) is currently being presented on the display 120, in response to a tap (e.g., a touch of pointer 135 being located at a particular pixel location and having minimal duration) being detected by the touch sensitive interface 130 (and the touch detection component 210) the continuous spectrum can be replaced by a discrete spectrum (e.g., spectrum 360), thereby enabling an individual to select object coloration based upon the colors presented in the plurality of segments of the discrete spectrum (e.g., any of the twelve colors RO, O, OY, Y, YG, G, GB, B, BP, P, PR, R presented in spectrum 360). Replacement of the continuous spectrum 310 with the discrete spectrum 360 can be based upon an instruction generated by the spectrum selection component 230 in accordance with a signal received from the touch detection component 210. During replacement of the continuous spectrum 310 with the discrete spectrum 360, the spectrum mapping component 240 can remap the pixels forming the hue spectrum region 124 from the continuous spectrum 310 hue to the discrete spectrum 360 hues.

(b) during presentment of a discrete spectrum comprising a plurality of discrete segments of color, e.g., per spectrum 360, a tap (e.g., as detected by the touch sensitive interface 130, and the touch detection component 210) on a color segment (e.g., any of the twelve colors RO, O, OY, Y, YG, G, GB, B, BP, P, PR, R presented in spectrum 360) can be utilized to select and/or assign the selected color. For example, it is desired that an object is to be assigned color YG, and accordingly, a tap motion applied to the segment YG assigns the color YG to the object.

(c) during presentment of a discrete spectrum (e.g., spectrum 360), to enable color presentation in the form of a continuous spectrum (e.g., (e.g., spectrum 310), a sliding motion of the pointer 135 horizontally along the discrete spectrum, from a first pixel to a second pixel, can be detected by the touch sensitive interface 130, (and the touch detection component 210) wherein the discrete spectrum is replaced with a continuous spectrum (per instruction from the spectrum selection component 230). In an embodiment, the example twelve hues maintain their relative locations but numerous hues in between are presented as well, to form the continuous spectrum, as previously described. Replacement of the discrete spectrum 360 with the continuous spectrum 340 can be based upon an instruction generated by the spectrum selection component 230 in accordance with a signal received from the touch detection component 210. During replacement of the discrete spectrum 360 with the continuous spectrum 340, the spectrum mapping component 240 can remap the pixels forming the hue spectrum region 124 from the discrete spectrum 360 hue to the continuous spectrum 340 hues. In an embodiment, selection of the first pixel (a start pixel) and the second pixel (an end pixel) can indicate a color range for the continuous spectrum. For example, an initial discrete spectrum comprising the twelve colors RO, O, OY, Y, YG, G, GB, B, BP, P, PR, R (e.g., a presented in spectrum 360) can be presented on the display device 120. A pointer 135 is placed at a first pixel located in the OY segment to select the start color, a sliding motion with the pointer 135 on the display screen 120 through neighboring segments ends at a second pixel located in segment P, at which the pointer 135 is removed from the display screen 120 (e.g., as detected by the touch sensitive interface 130, and the touch detection component 210). Accordingly, the discrete spectrum is replaced with a continuous spectrum, wherein the continuous spectrum has a color range from OY to P, and the various colors and intermediate hues therebetween. Tapping on a color in the continuous spectrum reverts displaying the discrete spectrum.

(d) during presentment of the continuous spectrum (e.g., spectrum 340), a sliding motion of the pointer 135 along the continuous spectrum can be detected by the touch sensitive interface 130 (and the touch detection component 210), wherein an initial pixel position (start position) of the pointer 135 provides a first color, and a final pixel position (end position) of the pointer 135 motion provides a second color. With an object selected, the selected first and second colors can control transition of coloration of the object from the selected first color through to the selected second color, where the transition includes the respective hues between the first color and the second color. Coloration of the object can be controlled by the color assignment component 250, in conjunction with the spectrum mapping component 240.

(e) during presentment of the continuous spectrum (e.g., spectrum 340), a sliding motion of the pointer 135 along the continuous spectrum can be detected by the touch sensitive interface 130 (and the touch detection component 210), where, an initial pixel position (start position) of the pointer 135 provides a first color and a final pixel position (end position) of the pointer 135 provides a second color. The selected first and second colors can act as inputs to other functionality described further herein, such as the first color and the second color operate as start and finish colors utilized for depiction of notes in a chord (e.g., any of chords

550, 610, 620, 630). Coloration of the chord(s) can be controlled by the color assignment component 250, in conjunction with the spectrum mapping component 240.

(f) during presentment of the continuous spectrum (e.g., spectrum 340), a sliding motion of the pointer 135 along the continuous spectrum can be detected by the touch sensitive interface 130 (and the touch detection component 210), wherein an initial pixel position (start position) of the pointer 135 provides a first color and a final pixel position (end position) of the pointer 135 provides a second color. The selected first color and the selected second color can provide a color transition during an initial existence (appearance of a note or object), through to its termination (demise), e.g., a sustained note, a note that undergoes pitch bending, etc. Coloration of the object can be controlled by the color assignment component 250, in conjunction with the spectrum mapping component 240.

(g) during presentment of the continuous spectrum (e.g., spectrum 340), a detected sliding motion of the pointer 135 along the continuous spectrum (e.g., between a first pixel and a second pixel) can enable the continuous spectrum to be zoomed in, whereby, instead of presenting the continuous spectrum across the entire available hue spectrum (e.g., RO→R), the portion of the spectrum between the selected first color and the selected second color can now form the entirety of the continuous spectrum. For example, the first color is yellow (Y) and the second color is blue (B), hence the originally displayed RO→R spectrum is replaced with a spectrum comprising hues in the range Y→B. Zooming-in of the continuous spectrum can be controlled by one or more of the spectrum generation component 220, the spectrum selection component 230, the spectrum mapping component 240, and/or the color assignment component 250.

(g) during presentment of a vertical spectrum (e.g., spectrum 370), as a pointer 135 is moved across a segment in the vertical spectrum 350, a respective base hue pixel and intermediate hue pixels either side of the base hue pixel, as they are touched by moving the pointer 135 away, either up or down, from the central position, hues on either side of the base hue position can enable partial hues that are on either side of the base hue to be selected to create a shimmering effect (e.g., to convey a change in pitch, note bending, etc.). For example, the yellow (Y) hue segment $S_4$ of the vertical spectrum 370 is selected, wherein the pointer 135 is positioned over the centrally placed yellow (Y) hue, a selected object (e.g., any of objects 520-530) changes color to the yellow hue. As the pointer 135 is moved upwards with respect to the central position an intermediate hue(s) tending towards OY is applied to the object. As the pointer 135 is moved downwards, the yellow hue is applied to the object, and as the pointer 135 moves below the central position, intermediate hues tending towards YG are applied to the object, and so forth to produce the shimmering effect as the respective intermediate hues and base hue are selected and applied. Coloration of the object can be controlled by the color assignment component 250, in conjunction with the spectrum mapping component 240.

(h) a vertical spectrum (e.g., vertical spectrum 370) can be selected for presentment based upon a vertical motion of the pointer 135 being moved up and down on either a segment in a discrete spectrum or being moved up and down on a region of the continuous spectrum. Vertical up and down motion of the pointer 135 on either the discrete spectrum 540 or the continuous spectrum 580 can be detected by the touch sensitive interface 130 (and the touch detection component 210).

In a further embodiment, the touch sensitive interface 130 can utilize a function(s) 175 to determine any of the previously mentioned motions and/or interactions of the pointer 135 with the display device 120. Based upon the sensed motion of the pointer 135 by the touch sensitive interface 130, a result returned from execution of a function(s) 175 can be determined to be a pair of scalars which can be utilized to define a hue for an object, and further for brightness adjustment of the hue with which the object is colored (e.g., by the brightness selection component 260). In another embodiment, the result returned from execution of the function(s) 175 can be a pair of vectors, wherein each vector representing beginning and ending values, wherein a first vector is for hue and a second vector for brightness adjustment.

In another embodiment, for activities which can require a discrete (named) color, a function 170 or 175 can be a step-wise linear function which is quantized. A scalar (single value) within each step of the step-wise linear function is chosen to present the hue for a range of touched points.

Further, when a pointer 135 is engaged in a long pressing motion, long sliding motion, or long panning motion temporal information is also returned, such that, for example, a quick motion may indicate that a logarithmic function should be utilized when interpolating between the beginning and ending values while a slower motion may indicate that a linear function should be utilized. A threshold value 185 can be utilized to determine between a long motion or a quick motion. For example, a threshold value 185 of 1 second can be utilized, wherein a sliding motion that is measured to be quicker than 1 second determines that a transition of hues between the beginning value and the ending value is based upon a logarithmic function. Alternatively, when a sliding motion of longer than 1 second is detected, then a transition between the beginning hue and the ending hue is based upon a linear function. The threshold value 185 can be stored in the data store 136, and can be utilized by the touch detection component 210 to determine the transition to be applied to a hue spectrum. The logarithmic function and/or the linear function can be utilized to also control display of the continuous hue spectrum (e.g., any of the continuous spectrums 310, 340, 580, etc.) can be presented with the hues arranged on a logarithmic scale or a linear scale.

FIGS. 7-10 illustrate exemplary methodologies relating to visual music objects. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

Figure 7:
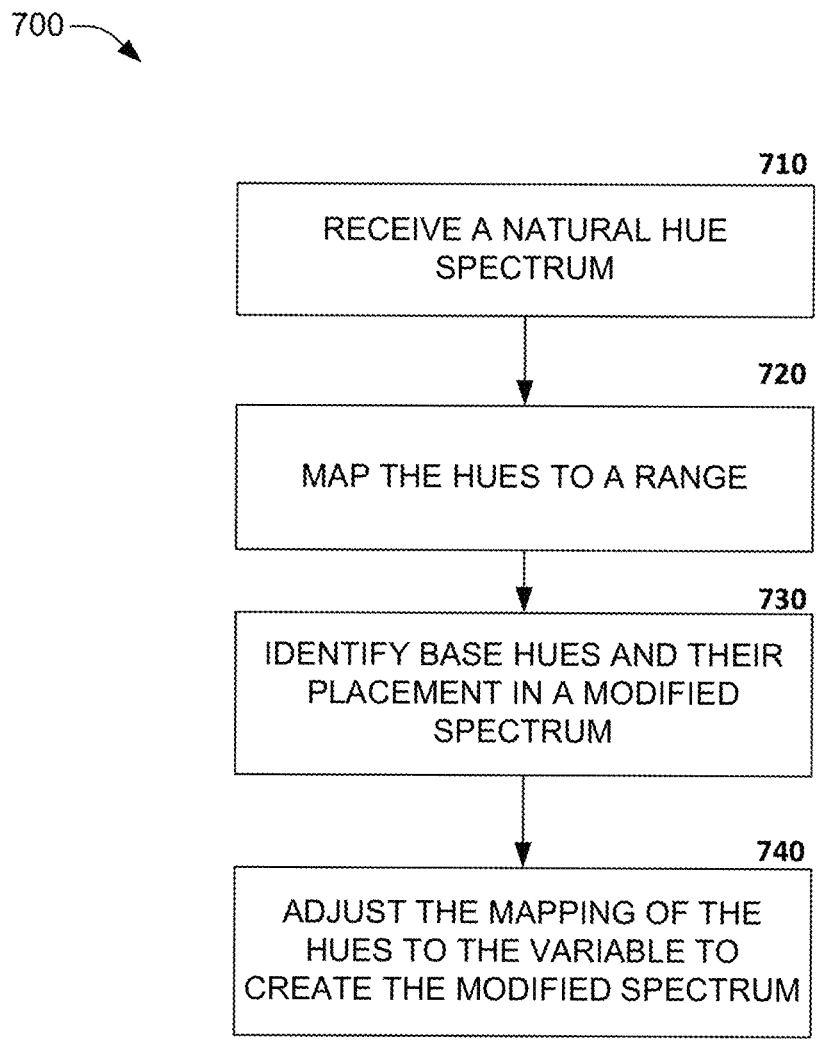
FIG. 7 is a flow diagram illustrating an exemplary methodology for modifying a hue spectrum.

FIG. 7 illustrates a methodology 700 for modifying a spectrum comprising natural hues visible to the unaided eye. At 710, a natural hue spectrum is received, which as previously mentioned, comprises a plurality of base hues RO, O, OY, Y, YG, G, GB, B, BP, P, PR, R, and respective intermediate hues, the natural hue spectrum can be a continuous spectrum. At 720, the natural spectrum can be mapped to a range, e.g., a start hue in the spectrum (e.g., at the RO hue end of the spectrum) and a base hue in the spectrum (e.g., at the R hue end of the spectrum) can be mapped to a variable having a continuous range from 0.00-1.00, with all the hues in between having a value between 0.00-1.00. At 730, the plurality of base hues can be identified, and their respective values in the range 0.00-1.00 can be determined. At 740, a function (e.g., an algorithm) can be applied to the natural hue spectrum to enable placement of the base hues to be adjusted such that each base hue is positioned equally across the spectrum, to form a modified hue spectrum, wherein the modified hue spectrum is also a continuous spectrum.

Figure 8:
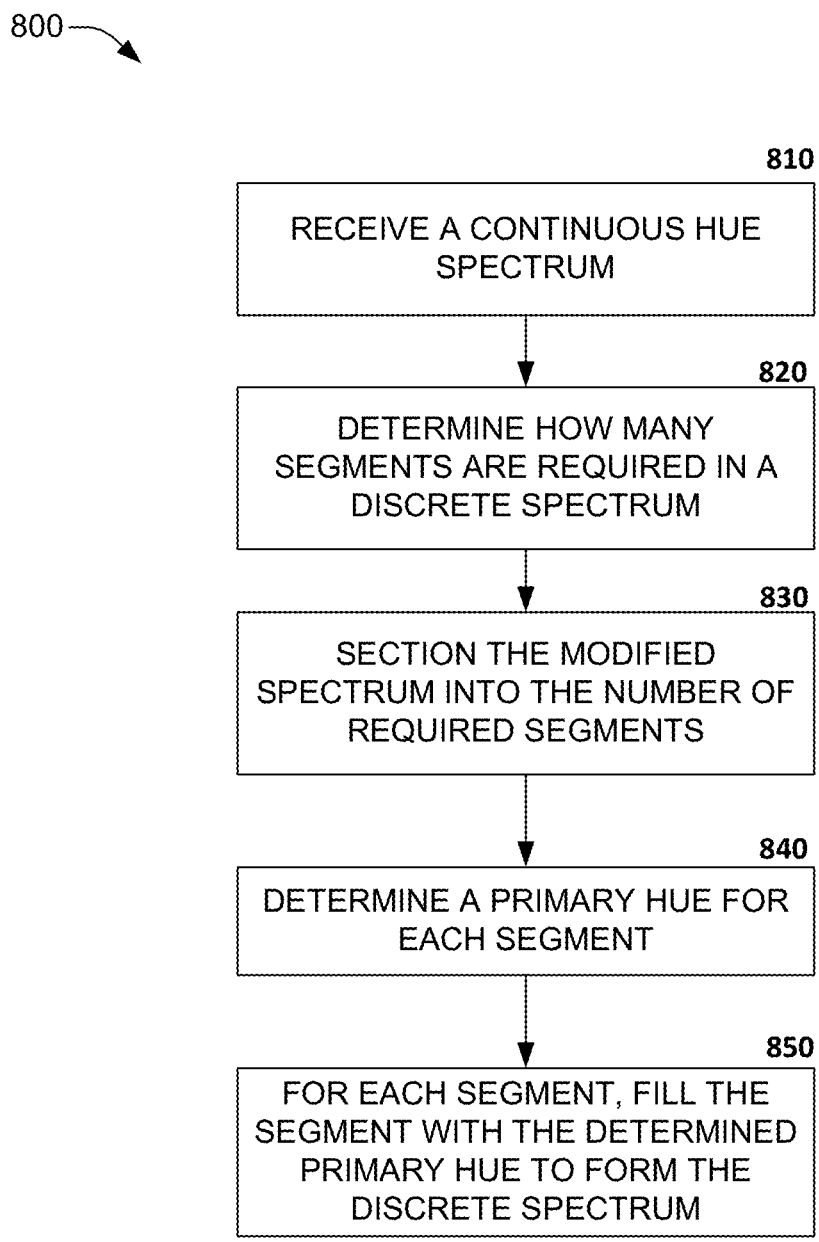
FIG. 8 is a flow diagram illustrating formation of a discrete hue spectrum from a continuous hue spectrum.

FIG. 8 illustrates a methodology 800 for generating a discrete hue spectrum from a continuous spectrum. At 810, a continuous hue spectrum is received. The continuous hue spectrum can be a natural hue spectrum comprising natural hues visible to the unaided eye, a modified hue spectrum generated from the natural hue spectrum (as previously described), or another spectrum of hues in a continuous form. At 820, as previously described, a continuous hue spectrum can be sectioned into a discrete hue spectrum. Hence, the number of segments in the discrete hue spectrum can be identified. For example, the preceding discussion utilized a discrete hue spectrum having twelve segments At 830, the modified hue spectrum can be sectioned into the number of segments defined at 820. At 840, a primary hue for each segment can be determined. For example, the primary hue for each segment can be the central hue of the segment resulting from the sectioning operation. In an alternative embodiment, the primary hue can be any hue (e.g., an intermediate hue) that is located in the respective segment. At 850, each segment can be filled with the determined primary hue, wherein the plurality of colored segments form a discrete hue spectrum.

Figure 9:
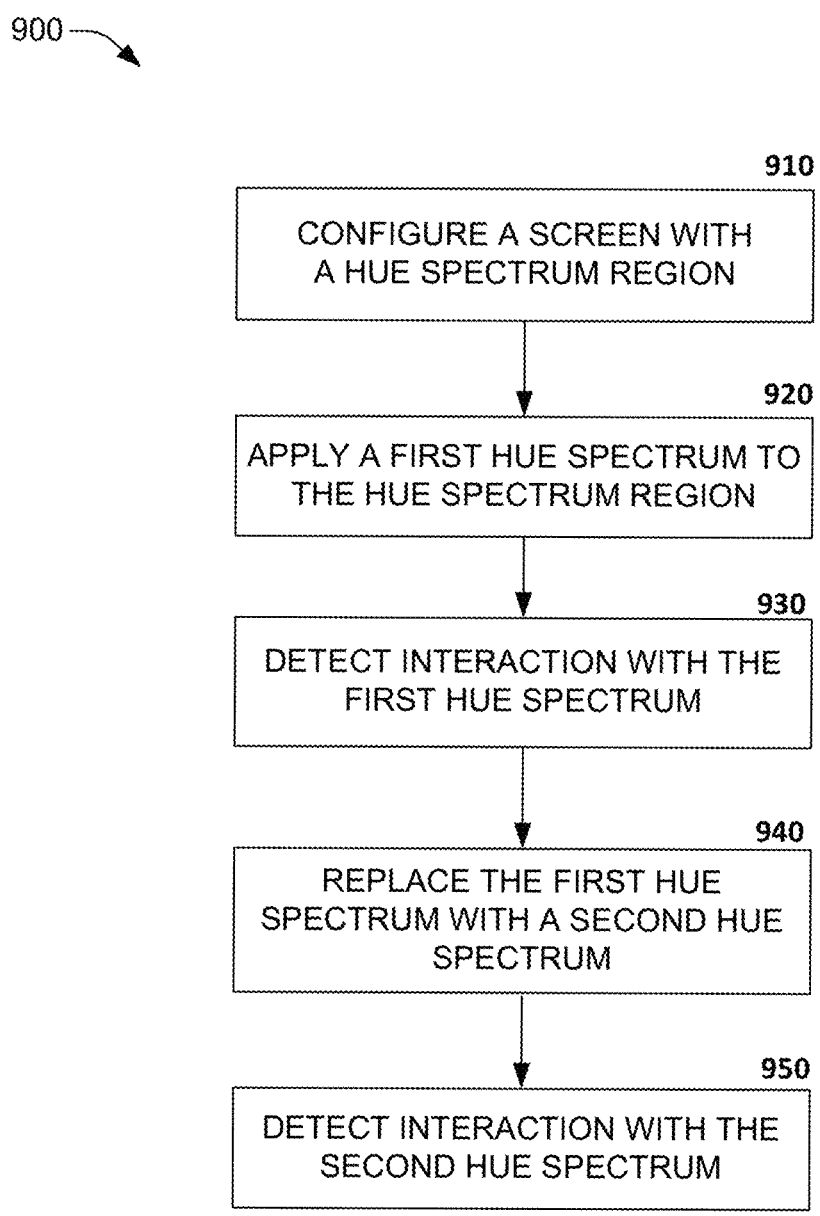
FIG. 9 is a flow diagram illustrating alternation of spectrums presented on a display.

FIG. 9 illustrates a methodology 900 for generating and presenting one or more hue spectrums on a screen. At 910, a screen for presentment on a display device is configured to include a hue spectrum region, wherein the hue spectrum region functions as a portion of the screen at which one or more hue spectrums can be alternately displayed, for example a continuous hue spectrum can be displayed at the hue spectrum region, to be subsequently replaced with a discrete hue spectrum. At 920, a first hue spectrum can be applied to the hue spectrum region. The first hue spectrum can be a continuous hue spectrum, a discrete hue spectrum, a vertical hue spectrum, etc., as previously described. In an example initial state of the hue spectrum region, a continuous hue spectrum is applied to the hue spectrum region, wherein further, the continuous hue spectrum is a modified hue spectrum (as previously described). At 930, interaction with the first hue spectrum is detected. The screen can be presented on a display device that has a touchscreen, and as a pointer is positioned at the hue spectrum region, the touch of the pointer is detected. At 940, in response to determining that the touch is a tap motion (e.g., of single location and minimal duration), the tap motion is processed to identify that the first hue spectrum is to be replaced with a second hue spectrum. For example, where the first hue spectrum is a continuous hue spectrum, it is replaced with the second hue spectrum which is a discrete hue spectrum. At 950, further interaction with the second hue spectrum can be detected, and a subsequent action performed, where such action includes selecting a color from the second hue spectrum to apply to an object being displayed on the screen, redisplaying the first hue spectrum, selecting a hue range to apply to an object or a chord, presenting a vertical hue spectrum, etc., as previously described.

Figure 10:
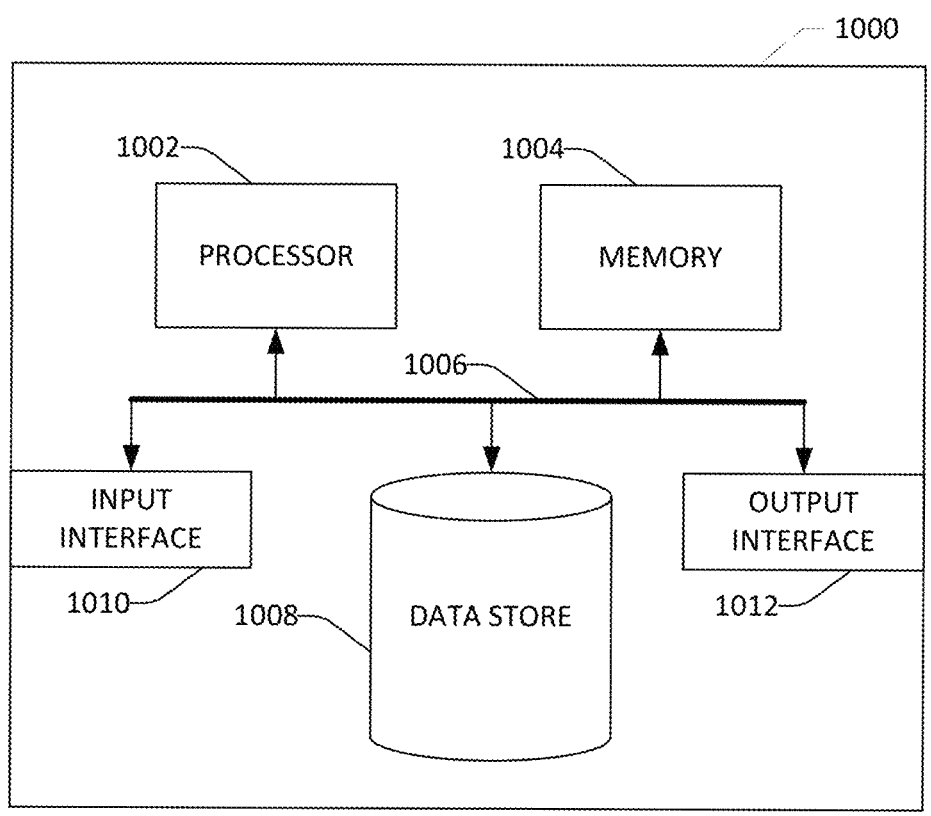
FIG. 10 illustrates an exemplary computing device.

Referring now to FIG. 10, a high-level illustration of an exemplary computing device 1000 that can be used in accordance with the systems and methodology disclosed herein is illustrated. For example, the computing device 1000 may be utilized to enable interaction with one or more objects being displayed during a visual music presentation. For example, the computing device 1000 can operate as the computing system 101, or a portion thereof. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store signatures, time-series signals, etc.

The computing device 1000 additionally includes a data store 1008 that is accessible by the processor 1002 by way of the system bus 1006. The data store 1008 may include executable instructions, test signatures, standard signatures, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc., by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored or transmitted as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
at least one processor; and
memory that comprises computer-executable instructions that, when executed by the at least one processor, cause the at least one processor to perform acts comprising:
controlling a display device to present a continuous hue spectrum within a hue spectrum region of the display device, wherein the continuous hue spectrum comprises a continuous range of selectable hues;
detecting a first touch within the hue spectrum region of the display device;
responsive to detection of the first touch within the hue spectrum region, controlling the display device to present a discrete hue spectrum within the hue spectrum region of the display device, wherein the discrete hue spectrum replaces the continuous hue spectrum within the hue spectrum region of the display device, and wherein the discrete hue spectrum comprises a discrete set of selectable hues;
detecting a second touch at a first pixel in a plurality of pixels located within the hue spectrum region of the display device;
identifying a location of the first pixel in the plurality of pixels at which the second touch occurred;
responsive to identifying the first pixel location, determining a hue assigned to the first pixel; and
applying the determined hue to an object.

2. The system of claim 1, the acts further comprising:
detecting a third touch within the hue spectrum region of the display device, wherein the third touch is a motion between a second pixel in the plurality of pixels and a third pixel in the plurality of pixels;
identifying a location of the second pixel in the plurality of pixels at which the third touch began and the third pixel in the plurality of pixels at which the third touch ended;
responsive to identifying the third touch is a motion between the second pixel and the third pixel, controlling the display device to replace the discrete hue spectrum with the continuous hue spectrum within the hue spectrum region of the display device.

3. The system of claim 1, wherein the continuous hue spectrum is formed from a natural hue spectrum with a naturally occurring hue distribution, and comprises a plurality of equally spaced positions, wherein the continuous hue spectrum is configured such that each position has a unique base hue assigned thereto.

4. The system of claim 1, wherein the display device comprises one of a tablet personal computer, a personal computer, a mobile phone, or a mobile computing device.

5. The system of claim 1, the acts further comprising empirically adjusting a brightness of each selectable hue to a consistent perceptual level.

6. The system of claim 1, wherein the detecting of the first touch is responsive to a stylus, a pointer, a cursor, a human body part, or an object being brought into proximity to the hue spectrum region of the display device.

7. The system of claim 1, wherein the discrete hue spectrum comprises a plurality of equally sized segments, wherein each segment is formed by:
aligning the continuous hue spectrum between a first hue and a second hue, such that the continuous hue spectrum is aligned horizontally between the first hue and the second hue;
dividing the continuous hue spectrum into a plurality of segments, wherein the division is performed such that the plurality of segments are of equal width along the horizontally aligned continuous hue spectrum;
identifying a base hue in each segment in the plurality of segments;
assigning each identified base hue to the respective segment for which it was identified; and
assigning, for each pixel in each segment, the base hue identified from that segment.

8. The system of claim 1, wherein the first touch is a vertical motion between a second pixel in the plurality of pixels and a third pixel in the plurality of pixels, and wherein the acts further comprise:
responsive to identifying the first touch is a vertical motion between the second pixel and the third pixel, controlling the display device to replace the continuous hue spectrum with a vertical hue spectrum within the hue spectrum region of the display device, wherein the vertical hue spectrum comprises a plurality of segments, each segment comprises a constant hue in a horizontal direction, and a plurality of hues transitioning vertically across each segment.

9. A method performed by a computer system that includes a processor and a memory, the method comprising:
controlling a display device to present a continuous hue spectrum within a hue spectrum region of the display device, wherein the continuous hue spectrum comprises a continuous range of selectable hues;
detecting a first touch within the hue spectrum region of the display device;
responsive to detection of the first touch within the hue spectrum region, controlling the display device to present a discrete hue spectrum within the hue spectrum region of the display device, wherein the discrete hue spectrum replaces the continuous hue spectrum within the hue spectrum region of the display device, and wherein the discrete hue spectrum comprises a discrete set of selectable hues;
detecting a second touch at a first pixel in a plurality of pixels located within the hue spectrum region of the display device, wherein the first touch is located at a second pixel in the plurality of pixels;
identifying a location of the first pixel in the plurality of pixels at which the second touch occurred;
responsive to identifying the first pixel location, determining a hue assigned to the first pixel; and
applying the determined hue to an object.

10. The system of claim 1, wherein the system is a computing device.

11. The system of claim 10, wherein the computing device comprises the display device.

12. The method of claim 9, the acts further comprising:
   detecting a third touch within the hue spectrum region of the display device, wherein the third touch is a motion between a third pixel in the plurality of pixels and a fourth pixel in the plurality of pixels;
   identifying a location of the third pixel in the plurality of pixels at which the third touch began and the fourth pixel in the plurality of pixels at which the third touch ended;
   responsive to identifying the third touch is a motion between the third pixel and the fourth pixel, controlling the display device to replace the discrete hue spectrum with the continuous hue spectrum within the hue spectrum region of the display device.

13. The method of claim 12, further comprising determining a duration for the motion between the third pixel and the fourth pixel;
   in response to determining that the duration is less than a threshold value, displaying the continuous hue spectrum with the hues displayed on a logarithmic scale; and
   in response to determining that the duration is longer than the threshold value, displaying the continuous hue spectrum with the hues displayed on a linear scale.

14. The method of claim 9, wherein the continuous hue spectrum is formed from a natural hue spectrum with a naturally occurring hue distribution, and comprises a plurality of equally spaced positions, wherein the continuous hue spectrum is configured such that each position has a unique base hue assigned thereto.

15. The method of claim 9, wherein the display device comprises one of a tablet personal computer, a personal computer, a mobile phone, or a mobile computing device.

16. The method of claim 9, wherein the object is a first object in plurality of objects, each object in the plurality of objects is assigned a respective hue, the acts further comprising adjusting a respective hue of each object in the plurality of objects according to the hue applied to the first object to maintain a hue relationship between the plurality of hues, wherein the plurality of hues are presented during a visual music presentation.

17. The method of claim 9, wherein the discrete hue spectrum comprises a plurality of equally sized segments, wherein each segment is formed by:
   aligning the continuous hue spectrum between a first hue and a second hue, such that the continuous hue spectrum is aligned horizontally between the first hue and the second hue;
   dividing the continuous hue spectrum into a plurality of segments, wherein the division is performed such that the plurality of segments are of equal width along the horizontally aligned continuous hue spectrum;
   identifying a base hue in each segment in the plurality of segments;
   assigning each identified base hue to the respective segment for which it was identified; and
   assigning, for each pixel in each segment, the base hue identified from that segment.

18. A non-transitory computer-readable medium including computer-executable instructions that, when executed by a processor, cause the processor to perform acts including:
   controlling a display device to present a continuous hue spectrum within a hue spectrum region of the display device, wherein the continuous hue spectrum comprises a continuous range of selectable hues;
   detecting a first touch within the hue spectrum region of the display device;
   responsive to detection of the first touch within the hue spectrum region, controlling the display device to present a discrete hue spectrum within the hue spectrum region of the display device, wherein the discrete hue spectrum replaces the continuous hue spectrum within the hue spectrum region of the display device, and wherein the discrete hue spectrum comprises a discrete set of selectable hues;
   detecting a second touch at a first pixel in a plurality of pixels located within the hue spectrum region of the display device;
   identifying a location of the first pixel in the plurality of pixels at which the second touch occurred;
   responsive to identifying the first pixel location, determining a hue assigned to the first pixel; and
   applying the determined hue to an object.

19. The computer-readable medium of claim 18, wherein the display device comprises one of a tablet personal computer, a personal computer, a mobile phone, a mobile computing device.

20. The computer-readable medium of claim 18, wherein the detecting of the first touch is responsive to a stylus, a pointer, a cursor, a human body part, or an object being brought into proximity to the hue spectrum region of the display device.

\* \* \* \* \*